(12) United States Patent
Engelhardt

(10) Patent No.: US 12,587,076 B2
(45) Date of Patent: Mar. 24, 2026

(54) ELECTRIC MACHINE, METHOD FOR OPERATING SAID MACHINE, AND MOTOR VEHICLE

(71) Applicant: Dr. Ing. h.c. F. Porsche Aktiengesellschaft, Stuttgart (DE)

(72) Inventor: Tobias Engelhardt, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 243 days.

(21) Appl. No.: 18/475,250

(22) Filed: Sep. 27, 2023

(65) Prior Publication Data

US 2024/0120819 A1 Apr. 11, 2024

(30) Foreign Application Priority Data

Oct. 5, 2022 (DE) ..................... 10 2022 125 596.4

(51) Int. Cl.
*H02K 21/02* (2006.01)
*H02K 1/16* (2006.01)

(52) U.S. Cl.
CPC ............. *H02K 21/022* (2013.01); *H02K 1/16* (2013.01)

(58) Field of Classification Search
CPC ...... H02K 1/16; H02K 21/022; H02K 21/028; H02K 2201/03
See application file for complete search history.

(56) References Cited

U.S. PATENT DOCUMENTS

| | | | |
|---|---|---|---|
| 4,027,229 A | 5/1977 | Frink | |
| 11,611,271 B2 | 3/2023 | Stanek et al. | |
| 2008/0265702 A1 | 10/2008 | Yeh | |
| 2010/0259208 A1 | 10/2010 | Hao et al. | |
| 2013/0026877 A1* | 1/2013 | Matsuda | H02K 1/17 |
| | | | 310/216.106 |

(Continued)

FOREIGN PATENT DOCUMENTS

| | | |
|---|---|---|
| DE | 102019106801 A1 | 9/2020 |
| DE | 102019214519 A1 | 3/2021 |

(Continued)

OTHER PUBLICATIONS

JP-2003264997-A, all pages (Year: 2003).*

*Primary Examiner* — Naishadh N Desai
(74) *Attorney, Agent, or Firm* — LEYDIG, VOIT & MAYER, LTD.

(57) ABSTRACT

An electric machine, including a housing, a rotor which includes a rotor shaft and a rotor laminated core, and a stator which includes a stator laminated core. The stator laminated core includes grooves in which stator windings are received. A respective tooth of the stator laminated core is arranged between two respective grooves that are arranged adjacent to one another in a circumferential direction of the stator laminated core. An annular gap is configured between the rotor laminated core and the stator laminated core, and a tooth head ring is arranged in the annular gap, a respective recess of the tooth head ring arranged between two tooth arranged adjacent to one another in a circumferential direction of the tooth head ring. A relative position of the stator laminated core and the tooth head ring is adjustable to a first and second relative position.

20 Claims, 5 Drawing Sheets

(56)     References Cited

U.S. PATENT DOCUMENTS

2021/0313868 A1   10/2021   Hayashi

FOREIGN PATENT DOCUMENTS

DE      102020117274 B3     9/2021
EP          3526885 B1    12/2021
JP         2002281695 A     9/2002
JP         2003264997 A  *  9/2003

* cited by examiner

ELECTRIC MACHINE, METHOD FOR OPERATING SAID MACHINE, AND MOTOR VEHICLE

CROSS REFERENCE TO RELATED APPLICATIONS

This application claims benefit to German Patent Application No. DE 10 2022 125 596.4, filed on Oct. 5, 2022, which is hereby incorporated by reference herein.

FIELD

The invention relates to an electric machine. The invention also relates to a motor vehicle. The invention also relates to a method for operating an electric machine.

BACKGROUND

The basic design of an electric machine is known from practice. For example, an electric machine has a housing and a stator, which comprises a stator laminated core. The stator is also referred to as the stand. An electric machine also has a rotor, which comprises a rotor shaft and a rotor laminated core. The rotor is also referred to as the runner. The rotor is rotatably mounted in the housing.

DE 10 2019 106 801 A1 and DE 10 2020 117 274 B3 each disclose electric machines with a stator and a rotor, wherein the stator has grooves in which stator windings are received. The grooves of the stator are configured so as to open radially inward, namely facing the rotor, wherein webs extend radially inward in the circumferential direction in order to partially close the grooves.

US 2013/0 026 877 A1, US 2008/0 265 702 A1, DE 10 2019 214 519 A1, and EP 3 526 885 B1 disclose further electric machines.

SUMMARY

In an embodiment, the present disclosure provides an electric machine, comprising a housing, a rotor which comprises a rotor shaft and a rotor laminated core, and a stator which comprises a stator laminated core, wherein the stator laminated core comprises grooves in which stator windings are received, wherein a respective tooth of the stator laminated core is arranged between two respective grooves that are arranged adjacent to one another in a circumferential direction of the stator laminated core. The electric machine comprises an annular gap configured between the rotor laminated core and the stator laminated core and a tooth head ring arranged in the annular gap, a respective recess of the tooth head ring being arranged between two tooth heads of the tooth head ring that are arranged adjacent to one another in a circumferential direction of the tooth head ring. Via a relative movement between the stator laminated core and the tooth head ring, a relative position of the stator laminated core and the tooth head ring is adjustable such that, in a first relative position of the stator laminated core and the tooth head ring, the tooth heads of the tooth head ring radially inwardly abut the teeth of the stator laminated core, and, in a second relative position of the stator laminated core and the tooth head ring, the tooth heads radially inwardly abut the grooves of the stator laminated core.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
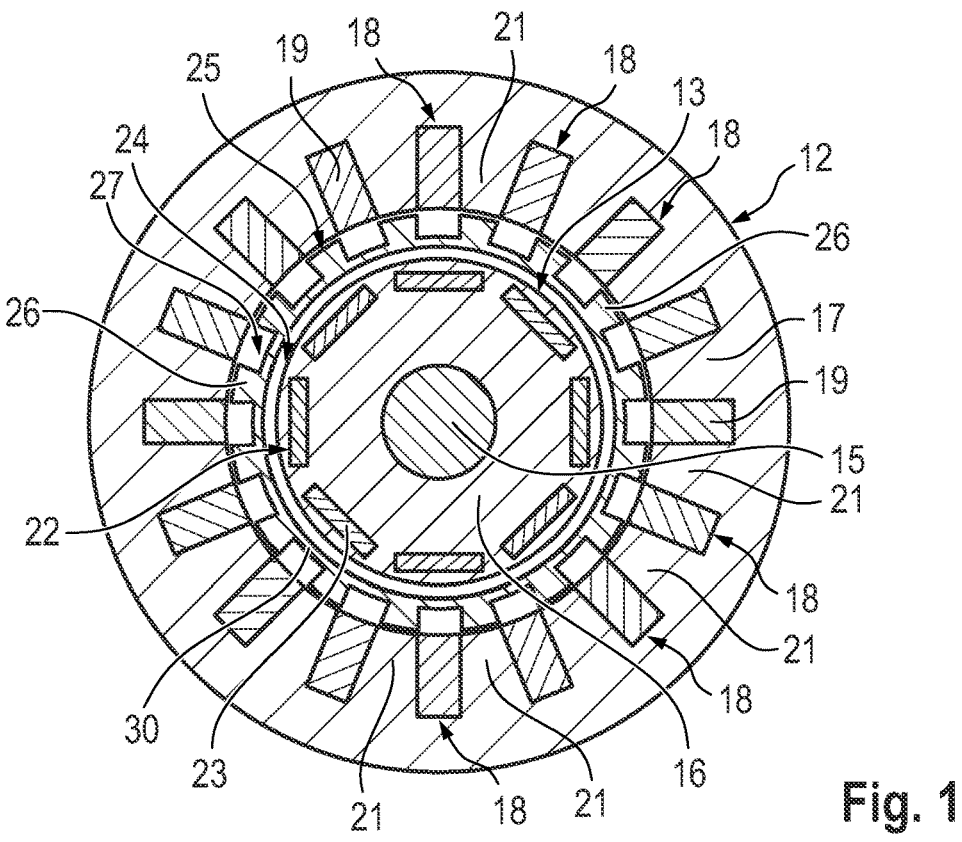
FIG. 1 illustrates a schematic cross-section in a radial cut direction through a first electric machine according to an embodiment of the invention in a first state thereof.

There is a need for an electric machine that can be operated efficiently in various load states and thus with a high performance coefficient, which preferably serves as a drivetrain assembly of a motor vehicle. In an embodiment, the invention provides a corresponding electric machine, a method for operating the same, and a motor vehicle having such an electric machine.

According to an embodiment of the invention, a tooth head ring is arranged in the annular gap between the stator laminated core and the rotor laminated core of the electric machine, wherein a respective recess of the tooth head ring is arranged between two tooth head rings arranged adjacent to one another in the circumferential direction of the tooth head ring.

Via a relative movement between the stator laminated core and the tooth head ring of the electric machine, the relative position of the stator laminated core and the tooth head ring is adjustable such that, in a first relative position of the stator laminated core and the tooth head ring, the tooth heads of the tooth head ring radially inwardly abut the teeth of the stator laminated core, and, in a second relative position of the stator laminated core and the tooth head ring, the tooth heads of the tooth head ring radially inwardly abut the grooves of the stator laminated core.

In an embodiment of the present invention, it is provided for the first time to arrange a tooth head ring in the annular gap formed between the rotor and the stator, namely between the stator laminated core and the rotor laminated core, of an electric machine, wherein the relative position between the stator laminated core and the tooth head ring is adjustable. This makes it possible to operate the electric machine efficiently and with a high performance coefficient in different load states thereof.

Then, when the tooth head ring heads radially inwardly abut the teeth of the stator laminated core in the first relative position of the stator laminated core and the tooth head ring, the greatest possible magnetic flux can be conducted through the stator and the tooth head ring, and the electric machine can provide a maximum torque.

The first relative position of the stator laminated core and the tooth head ring is useful in particular in the full-load operation of the electric machine.

In the second relative position of the stator laminated core and the tooth head ring, in which the tooth head ring heads radially abut the grooves of the stator laminated core, an increased air gap is provided and thereby the conduction of the magnetic flux is reduced. In the case of a permanently excited synchronous machine, the flux linkage of magnets thereof is thus reduced.

The second relative position of the stator laminated core and the tooth head ring is useful in particular in the semi-load operation of the electric machine. In semi-load operation, the efficiency of the electric machine can be improved, because losses, in particular so-called intrinsic losses, which are dominant at low load points of an electric machine, can be reduced.

According to a first embodiment of the invention, the stator laminated core is configured so as to be fixed in place together with the housing, wherein the tooth head ring is configured so as to be rotatable relative to the stator laminated core in the circumferential direction of the stator laminated core and the tooth head ring. According to a second embodiment of the invention, the tooth head ring is configured so as to be fixed in place together with the housing, wherein the stator laminated core is configured so as to be rotatable relative to the tooth head ring in the circumferential direction of the stator laminated core and the tooth head ring.

With embodiments of the invention, the relative position between the stator laminated core and the tooth head ring can be reliably adjusted in order to provide either the first relative position, in particular in full-load operation, or the second relative position, in particular in semi-load operation of the electric machine.

Preferably, the electric machine comprises an actuator configured so as to transition the stator laminated core or tooth head ring from the first relative position into the second relative position and from the second relative position into the first relative position.

In a first embodiment, the actuator can actively, and thus by actuation, influence the relative position between the stator laminated core and the tooth head ring in both directions of displacement, i.e. starting from the first relative position into the second relative position and, vice versa, from the second relative position into the first relative position.

In an alternative embodiment, it is possible that such an active or actuation-based influence or change of the relative position is only changed in one direction of displacement, whereas in the opposite direction of displacement a resetting element, which is preferably configured as a spring element, has a passive effect.

Then, when one of the relative positions is provided by a resetting element, which is preferably configured as a spring element, it is also possible to change the relative position by exploiting electromagnetic forces contrary to the resetting force of the resetting element. In this case, no active or actuation-based change of the relative position between the stator laminated core and the tooth head ring takes place, but rather only a passive change.

Preferably, the tooth heads of the tooth head ring and webs of the tooth head ring, which connect the teeth of the tooth head ring in the region of the recess of the tooth head ring, are each made from a metallic material, in particular as a laminated core. This design is simple and preferred.

Preferred embodiments of the invention follow from the following description. Without being restricted thereto, embodiment examples of the invention will be explained in greater detail with reference to the drawings.

Figure 2:
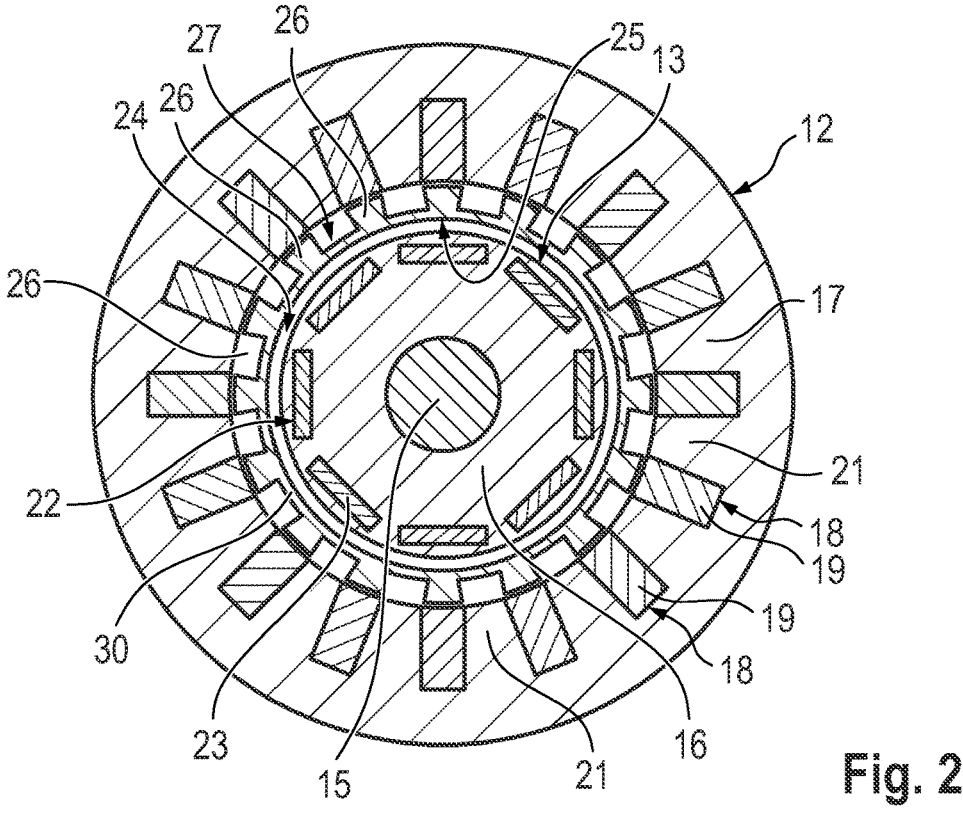
FIG. 2 illustrates the cross-section of FIG. 1 in a second state.
Figure 3:
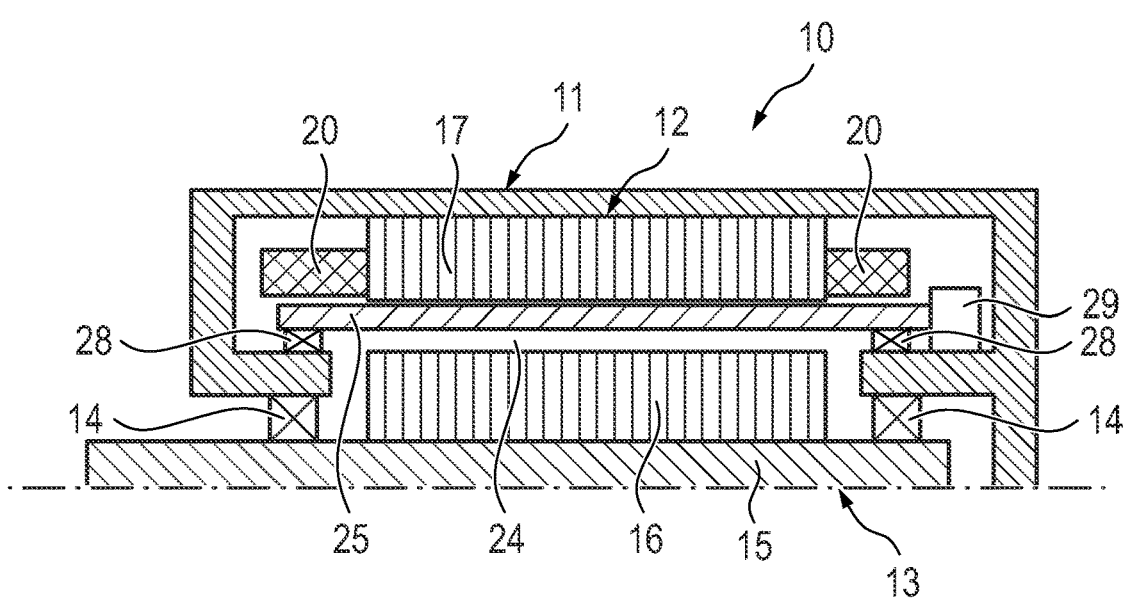
FIG. 3 illustrates a schematic cross-section in an axial cut direction through the first electric machine according to an embodiment of the invention.

FIGS. 1, 2, and 3 schematically show cross-sections through a first electric machine 10 according to the invention. FIG. 3 shows a housing 11, a stator 12, and a rotor 13 as main assemblies of the electric machine 10.

The rotor 13 has a rotor shaft 15 rotatably supported in the housing 11 via bearings 14, which shaft supports a rotor laminated core 16. The stator 12 comprises a stator laminated core 17. Grooves 18 are formed in the stator laminated core 17, wherein stator windings 19 are received in the grooves 18 of the stator laminated core 17. At opposing axial ends of the stator laminated core 17, the stator windings 19 project opposite the stator laminated core 17 (see FIG. 3) and form so-called winding heads 20.

Between two respective grooves 18 of the stator laminated core 17 that are adjacent to one another in the circumferential direction, a tooth 21 of the stator laminated core 17 is formed. The grooves 18 of the stator laminated core 17 are preferably configured so as to at least partially open radially inward.

In the embodiment example shown, magnets 23 are arranged in recesses 22 of the rotor laminated core 16. In the case of a permanently stimulated synchronous machine, the magnets 23 are permanent magnets. However, in the recesses 22 of the rotor laminated core 16 of the rotor 13, geometries generating a reluctance, rotor windings, or short-circuited cages made of copper or aluminum can also be provided in other designs.

An annular gap 24 is formed between the stator sheet 17 of the stator 12 and the rotor laminated core 16 of the rotor 13. According to an embodiment of the invention, a tooth head ring 25 is arranged in the annular gap 24 between the stator 12 and the rotor 13, namely the stator laminated core 17 and the rotor laminated core 16. The tooth head ring 25 has multiple tooth heads 26 that are arranged spaced apart in the circumferential direction, wherein a respective recess 27 is arranged or configured between two tooth heads 26 arranged adjacent to one another in the circumferential direction of the tooth head ring 25.

According to an embodiment of the invention, via a relative movement between the stator laminated core 12 and the tooth head ring 25 arranged in the annular gap 24 between the stator laminated core 12 and the rotor laminated core 16, the relative position between the stator laminated core 12 and the tooth head ring 25 is adjustable, namely such that, in a first relative position of the stator laminated core 17 and the tooth head ring 25 (see FIG. 1), the tooth heads 26 of the tooth head ring 27 radially inwardly abut the teeth 21 of the stator laminated core 17, whereas, in a second relative position of the stator laminated core 17 and the tooth head ring 25 (see FIG. 2), the tooth heads 26 of the tooth head ring 25 radially inwardly abut the grooves 18 and thus the stator windings 19 of the stator 12 or stator laminated core 17 arranged in the grooves 18.

The first relative position of FIG. 1 between the stator laminated core 17 and the tooth head ring 25 is set in particular when the electric machine is intended to produce a maximum torque under full load. In this relative position, a maximum possible magnetic flux can be conducted.

The second relative position of FIG. 2 is provided in particular for the semi-load operation of the electric machine 10 in order to reduce a magnetic flux conduction and to reduce losses in the semi-load operation and thereby ultimately increase the efficiency of the electric machine.

In the embodiment example of FIGS. 1, 2, and 3, the stator 12 of the electric machine 10, including its stator laminated core 17, as well as the housing 11 of the electric machine 10, is configured so as to be fixed in place, wherein the tooth head ring 25 of the electric machine 10 is then rotatable relative to the fixed stator laminated core 17 in the circumferential direction of the stator laminated core 17 and thus in the circumferential direction of the tooth head ring 25.

According to FIG. 3, the tooth head ring 25 of the electric machine 10 is supported via bearings 28 in the housing 11 at its axial ends, which project opposite the stator laminated core 17 of the stator 12, wherein the tooth head ring 25 can be displaced in a circumferential direction via an actuator 29 in order to transition the tooth head ring 25 from the first relative position into the second relative position or from the second relative position into the first relative position.

The actuator 29 of the electric machine 10 accordingly sets the relative position between the stator laminated core 17 and the tooth head ring 25 in order to provide the desired relative position between the stator laminated core 17 and the tooth head ring 25 depending on the load state of the electric machine 10.

Preferably, the tooth head ring 25 is composed of individual sheet-metal blanks, as is the stator laminated core 17, These are electric sheets that are packaged and are in particular connected with a bonding varnish or other full-surface glue for reasons of strength. In this case, the tooth head ring 25 is then made entirely of a metallic material, namely both the individual tooth heads 26 thereof and webs 30 thereof, via which the tooth heads 26 thereof are connected to one another in the region of the recesses 27 of the tooth head ring 25.

By contrast, it is also possible to manufacture only the tooth heads 26 of the tooth head ring 25 from a metallic material, whereas the webs 30 thereof, via which the tooth heads 26 of the tooth head ring 25 are connected to one another in the region of the recesses 27 of the tooth head ring 25, are made from plastic.

Figure 4:
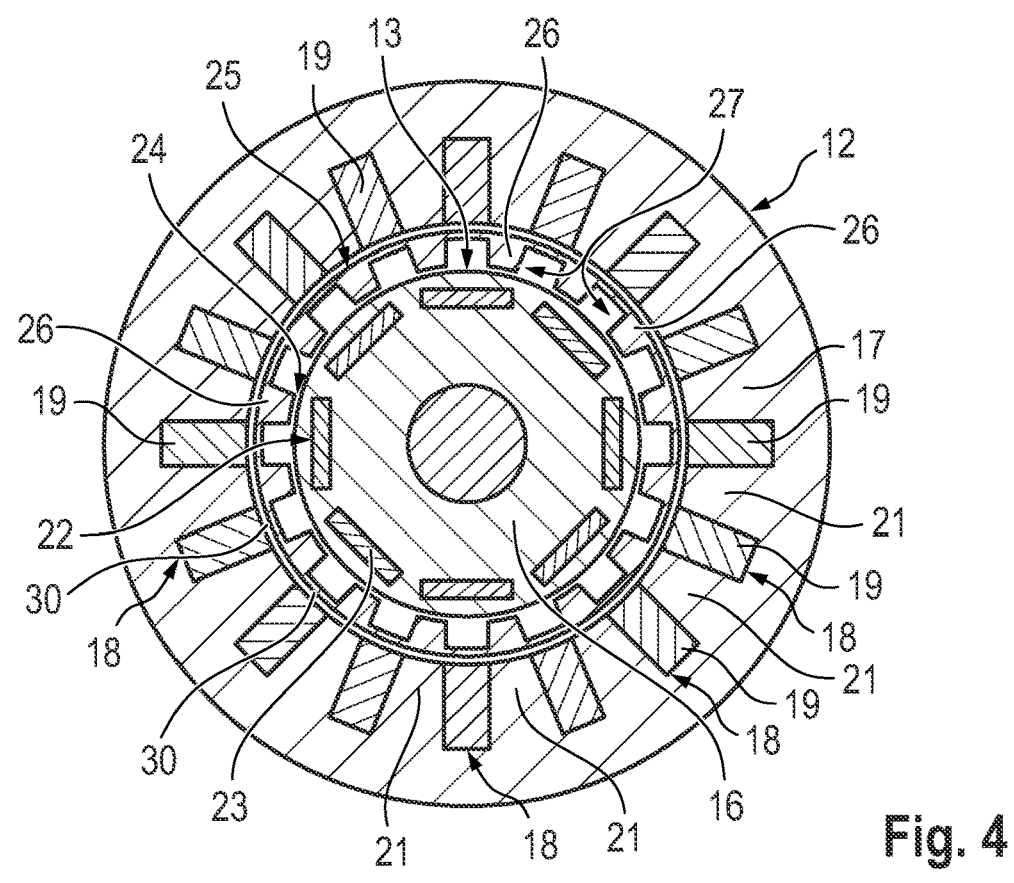
FIG. 4 illustrates a schematic cross-section in a radial cut direction through a second electric machine according to an embodiment of the invention in a first state thereof.

In the electric machine of FIGS. 1, 2, and 3, the recesses 27 of the tooth head ring 25 open radially outward towards the stator laminated core 17. The webs 30 of the tooth head ring 25 connecting the individual tooth heads 26 of the tooth head ring 25 are then arranged radially inward. By contrast, FIG. 4 shows an embodiment in which the recesses 27 of the tooth head ring 25 open radially inward towards the rotor laminated core 16, wherein, in this case, the webs 30 are then arranged so as to radially outwardly abut the stator laminated core 17. Otherwise, the embodiment of FIG. 4 matches the embodiment of FIGS. 1, 2, and 3.

In the embodiment example of FIGS. 1, 2, and 3, the tooth head ring 25 can be actively transitioned from the first relative position into the second relative position as well as from the second relative position into the first relative position via the actuator 29. For example, a corresponding actuator for actively transitioning the tooth head ring 25 between the respective relative positions and thus for changing the relative position between the stator laminated core 17 and the tooth head ring 25 can be an electrical actuator.

Figure 5:
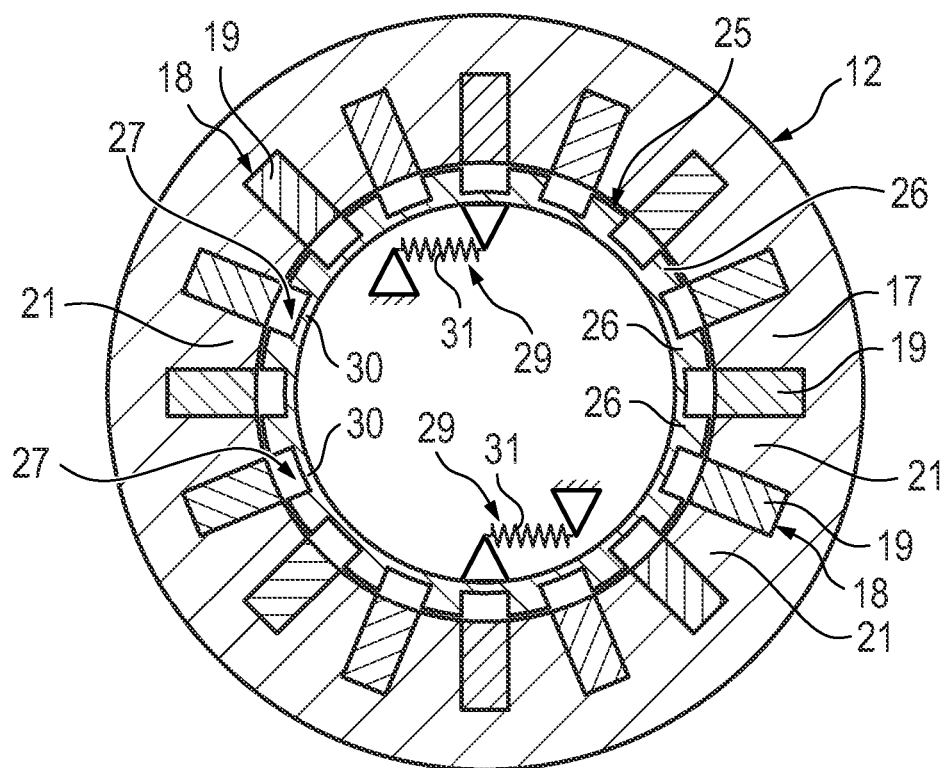
FIG. 5 illustrates a schematic cross-section in a radial cutting direction through a third electric machine according to an embodiment of the invention in a first state thereof.
Figure 6:
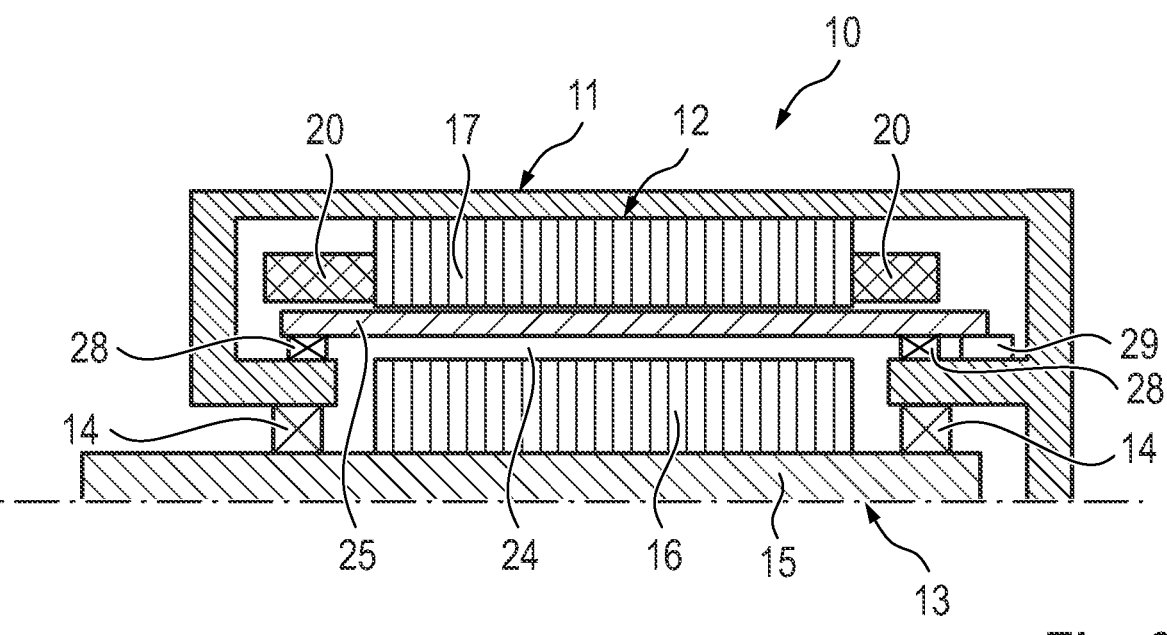
FIG. 6 illustrates a schematic cross-section in an axial cut direction through the third electric machine according to an embodiment of the invention.

FIGS. 5 and 6 show details of a third embodiment example of an electric machine 10, wherein the embodiment example of FIGS. 5 and 6 differs from the embodiment example of FIGS. 1, 2, and 3 only by the design of the actuator 29. Therefore, in order to avoid unnecessary repetitions for the same assemblies, like reference numbers are used and, for the embodiment example of FIGS. 5, 6, reference is made to the respective embodiments of the embodiment example of FIGS. 1, 2, and 3.

The embodiment example of FIGS. 5 and 6 differs from the embodiment example of FIGS. 1, 2, and 3 in that, in the embodiment example of FIGS. 5 and 6, the actuator 29 comprises passively acting resetting elements, which are configured as spring elements 31 and which, in FIGS. 5 and 6, push the tooth head ring 25, which can be rotated in a circumferential direction in relation to the fixed stator 12, into one of the two relative positions. From these relative positions, into which the resetting elements push the tooth head ring 25, the tooth head ring 25 can be actively, or also passively, transitioned into the respective other relative positions via an actuator.

Thus, it is provided in FIG. 5, 6 that the spring elements 31 push the tooth head ring 25 into the second relative position, in which the tooth heads 26 of the tooth head ring 25 radially adjoin the grooves 18 of the stator laminated core 17. From this second relative position, the tooth head ring 25 can then be displaced contrary to the spring force of the spring elements 31, either actively via an actuator or passively by exploiting electromagnetic forces that arise in operation of the electric machine.

Thus, in FIG. 5, 6, it can be provided that, from a particular load level, namely from a particular torque, which is provided by the electric machine 10, electromagnetic forces passively transition the tooth head ring 25 out of the second relative position contrary to the spring force of the spring elements and into the first relative position.

The spring elements 31 are dimensioned such that the tooth head ring 25 does not move up to a certain torque and remains in the second relative position, wherein, when this torque is exceeded, the tooth head ring 25 is automatically displaced into the first relative position corresponding to the relative position of FIG. 5 contrary to the spring force of the spring elements 31.

In order to avoid frequent switching back and forth and thus unwanted changing of the relative position of the tooth head ring 25 and the stator laminated core 17, a hysteresis can be adjusted on a spring characteristic curve of the spring elements 31 via friction elements.

Figure 7:
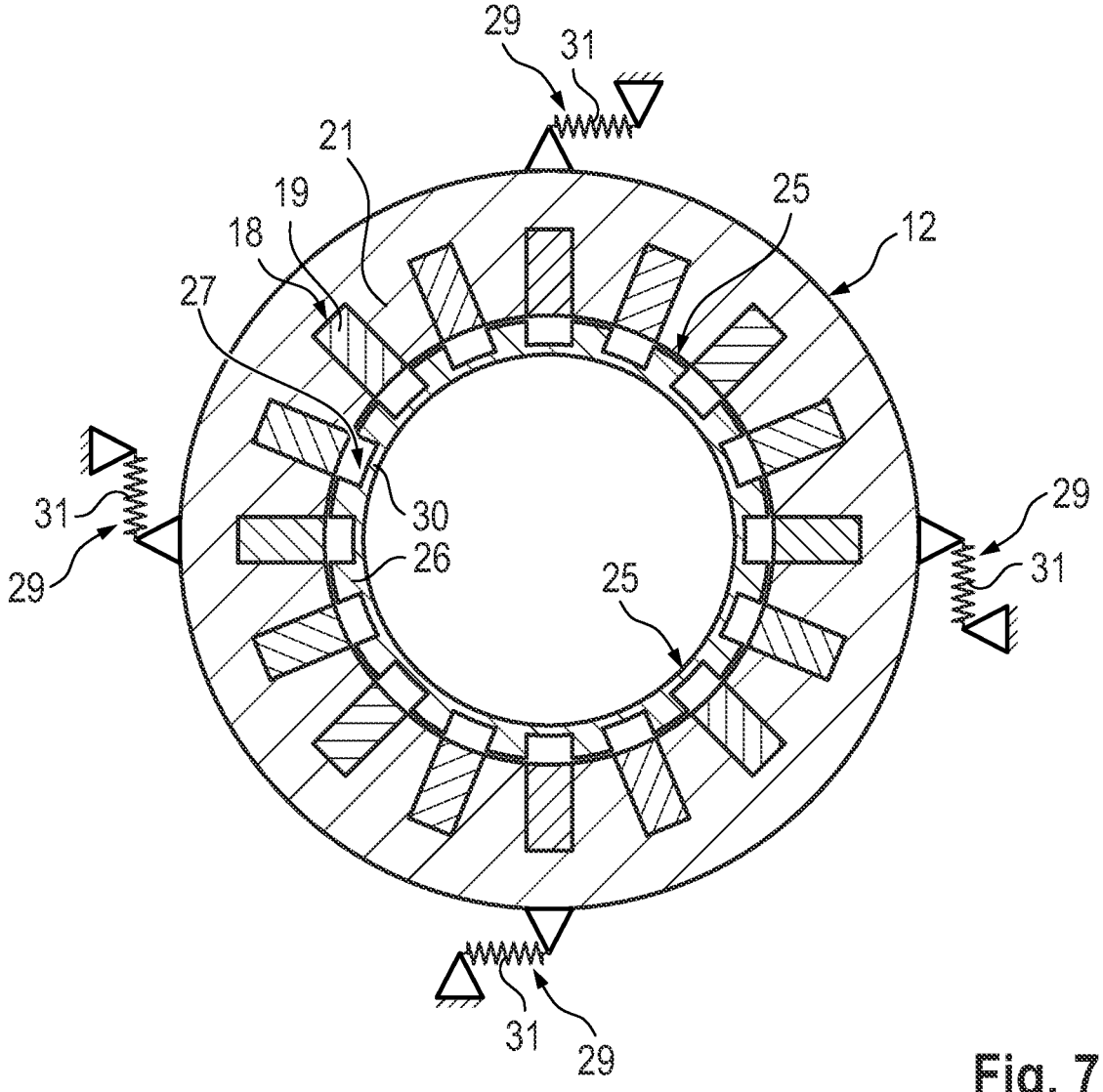
FIG. 7 illustrates a schematic cross-section in a radial cut direction through a fourth electric machine according to an embodiment of the invention in a first state thereof.
Figure 8:
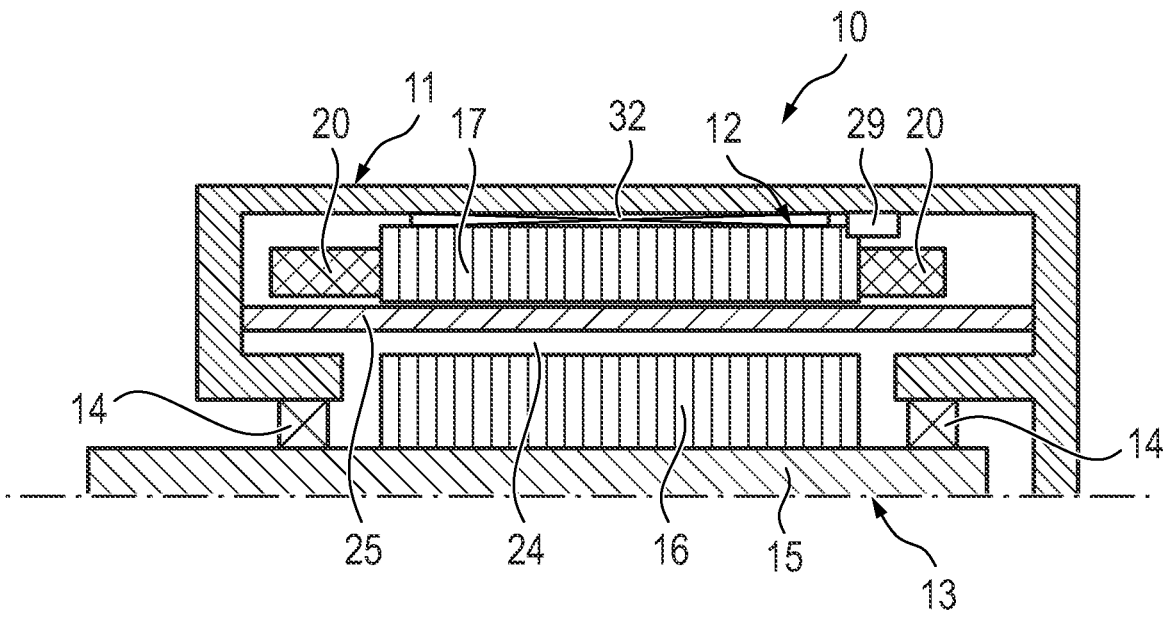
FIG. 8 illustrates a schematic cross-section in an axial cut direction through the fourth electric machine according to an embodiment of the invention.

FIGS. 7 and 8 show a third embodiment example of an electric machine 10, wherein the same reference numbers are again used for the same assemblies. The only details discussed are those in which the electric machine of FIGS. 7, 8 differs from the electric machines described above.

In the embodiment example of FIGS. 7 and 8, the tooth head ring 25 is fixedly connected to the housing 11 of the electric machine 10 in a housing; in order to change the relative position between the tooth head ring 25 and the stator laminated core 17 of the stator 12, the stator 12 in the housing 11 is rotatably supported via a bearing 32. The stator 12 or the stator laminated core 17 is pushed passively via resetting elements of the actuator 29 that are preferably configured as spring elements 31, in a manner analogous to the embodiment example of FIGS. 5 and 6, into a position in which the second relative position exists between the stator laminated core 17 and the tooth head ring 25, in which the tooth heads 26 of the tooth head ring 25 radially inwardly adjoin the grooves 18 of the stator laminated core 17. If the torque supplied by the electric machine at the shaft 15 is less than a limit value, the stator 12 remains in the relative position in relation to the tooth head ring 25 specified by the spring force of the spring elements 31.

Then, if the torque exceeds a limit value, the stator 12 is displaced from the second relative position into the first relative position in relation to the tooth head ring 25, contrary to the spring force of the spring elements 31. Again, this can be provided by corresponding sizing of the spring elements 31. Here, too, a hysteresis for the spring characteristic of the spring elements 31 can be provided via friction elements.

A stator support can be inserted between the stator laminated core 17 and the bearing 32, which can be configured as a thin-walled metal tube, for example.

In FIGS. 7 and 8, power connectors are flexibly formed on the stator so that the relative movement can be equalized.

In an embodiment of the present invention, an electric machine 10 is provided, in which a tooth head ring 25 is arranged in the annular gap 24 between the rotor 13 and the stator 12. The relative position between the tooth head ring 25 and the stator 12 can be actively, i.e. by actuation, or passively adjusted, depending on the load placed on the electric machine 10. In an embodiment of the invention, it is possible to efficiently operate an electric machine 10 at both full-load and semi-load.

An embodiment of the invention further relates to a motor vehicle, namely a hybrid vehicle or an electric vehicle having an electric machine 10 according to an embodiment of the invention serving as the drivetrain assembly.

An embodiment of the invention further relates to a method for operating an electric machine 10 according to an embodiment of the invention.

The relative position between the stator laminated core 17 and the tooth head ring 25 is adjusted depending on the operating point of the electric machine 10.

If, at the given operating point of the electric machine 10, the load or torque to be provided is less than a limit value, the second relative position of the stator laminated core 17 and the tooth head ring 25 is set, in which the tooth heads 26 radially inwardly adjoin the grooves 18 of the stator laminated core 17.

If, at the given operating point of the electric machine 10, the load or torque to be provided is greater than a limit value, the first relative position of the stator laminated core 17 and the tooth head ring 25 is set, in which the tooth heads 26 radially inwardly adjoin the teeth 21 of the stator laminated core 17.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electric machine, comprising:
   a housing;
   a rotor which comprises a rotor shaft and a rotor laminated core;
   a stator which comprises a stator laminated core, wherein the stator laminated core comprises grooves in which stator windings are received, wherein a respective tooth of a plurality of teeth of the stator laminated core is arranged between two respective grooves that are arranged adjacent to one another in a circumferential direction of the stator laminated core;
   an annular gap configured between the rotor laminated core and the stator laminated core;
   a tooth head ring arranged in the annular gap, a respective recess of the tooth head ring being arranged between two tooth heads of the tooth head ring that are arranged adjacent to one another in a circumferential direction of the tooth head ring; and
   at least one resetting element, which is configured to push the stator laminated core or the tooth head ring into a first relative position or into a second relative position by a resetting force of a respective resetting element of the at least one resetting element,
   wherein via a relative movement between the stator laminated core and the tooth head ring, a relative position of the stator laminated core and the tooth head ring is adjustable such that, in the first relative position of the stator laminated core and the tooth head ring, the tooth heads of the tooth head ring radially inwardly abut the teeth of the stator laminated core, and, in the second relative position of the stator laminated core and the tooth head ring, the tooth heads radially inwardly abut the grooves of the stator laminated core, and
   wherein the stator laminated core or the tooth head ring is transitionable into the second relative position or into the first relative position contrary to the resetting force of the respective resetting element.

2. The electric machine according to claim 1, wherein the stator laminated core is configured to be fixed in place together with the housing, and wherein the tooth head ring is configured rotatably relative to the stator laminated core in the circumferential direction of the stator laminated core and the tooth head ring.

3. The electric machine according to claim 1, wherein the tooth head ring is configured to be fixed in place together with the housing, and wherein the stator laminated core is configured rotatably relative to the tooth head ring in the circumferential direction of the stator laminated core and the tooth head ring.

4. The electric machine according to claim 1, wherein the at least one resetting element comprises an actuator configured to transition the stator laminated core or tooth head ring from the first relative position into the second relative position and from the second relative position into the first relative position.

5. The electric machine according to claim 1, wherein the respective resetting element is configured as a spring element.

6. The electric machine according to claim 1, wherein the tooth heads of the tooth head ring and webs of the tooth head ring connecting the tooth heads in a region of the recesses of the tooth head ring are respectively made from a metallic material.

7. The electric machine according to claim 1, wherein the tooth heads of the tooth head ring are made from a metallic material, and webs of the tooth head ring connecting the tooth heads in a region of the recesses of the tooth head ring are made from plastic.

8. The electric machine according to claim 1, wherein the recesses of the tooth head ring open radially outward towards the stator laminated core.

9. The electric machine according to claim 1, wherein the recesses of the tooth head ring open radially inward towards the rotor.

10. A motor vehicle, which is a hybrid vehicle or an electric vehicle, comprising the electric machine according to claim 1 serving as a drivetrain assembly.

11. A method for operating the electric machine, the electric machine being configured according to claim 1, the method comprising adjusting the relative position between the stator laminated core and the tooth head ring depending on an operating point of the electric machine.

12. The electric machine according to claim 6, wherein the tooth heads of the tooth head ring and the webs of the tooth head ring connecting the tooth heads in the region of the recesses of the tooth head ring are made as a laminated core.

13. An electric machine, comprising:

a housing;

a rotor which comprises a rotor shaft and a rotor laminated core;

a stator which comprises a stator laminated core, wherein the stator laminated core comprises grooves in which stator windings are received, wherein a respective tooth of a plurality of teeth of the stator laminated core is arranged between two respective grooves that are arranged adjacent to one another in a circumferential direction of the stator laminated core;

an annular gap configured between the rotor laminated core and the stator laminated core; and a tooth head ring arranged in the annular gap, a respective recess of the tooth head ring being arranged between two tooth heads of the tooth head ring that are arranged adjacent to one another in a circumferential direction of the tooth head ring, wherein via a relative movement between the stator laminated core and the tooth head ring, a relative position of the stator laminated core and the tooth head ring is adjustable such that, in a first relative position of the stator laminated core and the tooth head ring, the tooth heads of the tooth head ring radially inwardly abut the teeth of the stator laminated core, and, in a second relative position of the stator laminated core and the tooth head ring, the tooth heads radially inwardly abut the grooves of the stator laminated core, and wherein the tooth head ring is configured to be fixed in place together with the housing, and wherein the stator laminated core is configured rotatably relative to the tooth head ring in the circumferential direction of the stator laminated core and the tooth head ring.

14. The electric machine according to claim 13, comprising an actuator configured to transition the stator laminated core or tooth head ring from the first relative position into the second relative position and from the second relative position into the first relative position.

15. The electric machine according to claim 13, wherein the tooth heads of the tooth head ring and webs of the tooth head ring connecting the tooth heads in a region of the recesses of the tooth head ring are respectively made from a metallic material.

16. The electric machine according to claim 13, wherein the tooth heads of the tooth head ring are made from a metallic material, and webs of the tooth head ring connecting the tooth heads in a region of the recesses of the tooth head ring are made from plastic.

17. The electric machine according to claim 13, wherein the recesses of the tooth head ring open radially outward towards the stator laminated core.

18. The electric machine according to claim 13, wherein the recesses of the tooth head ring open radially inward towards the rotor.

19. The electric machine according to claim 15, wherein the tooth heads of the tooth head ring and the webs of the tooth head ring connecting the tooth heads in the region of the recesses of the tooth head ring are made as a laminated core.

20. A motor vehicle, which is a hybrid vehicle or an electric vehicle, comprising the electric machine according to claim 13 serving as a drivetrain assembly.

* * * * *